US008396372B2

(12) United States Patent
Chowdhury et al.

(10) Patent No.: US 8,396,372 B2
(45) Date of Patent: Mar. 12, 2013

(54) ASYMMETRIC LONG-HAUL TRANSMISSION PATHS WITH OPTICAL PHASE CONJUGATION

(75) Inventors: Aref Chowdhury, Springfield, NJ (US); Rene'-Jean Essiambre, Red Bank, NJ (US); Gregory Raybon, Shrewsbury, NJ (US)

(73) Assignee: Alcatel Lucent, Paris (FR)

(*) Notice: Subject to any disclaimer, the term of this patent is extended or adjusted under 35 U.S.C. 154(b) by 1912 days.

(21) Appl. No.: 10/932,980

(22) Filed: Sep. 2, 2004

(65) Prior Publication Data

US 2006/0045541 A1 Mar. 2, 2006

(51) Int. Cl.
*H04B 10/00* (2006.01)

(52) U.S. Cl. .................. 398/150; 398/141

(58) Field of Classification Search .......... 398/140–141, 398/150
See application file for complete search history.

(56) References Cited

U.S. PATENT DOCUMENTS

| 6,128,118 | A * | 10/2000 | Marcenac ............. 398/147 |
| 6,542,678 | B2 | 4/2003 | Essiambre et al. ....... 385/123 |
| 6,583,907 | B1 | 6/2003 | Essiambre ............. 359/161 |
| 6,606,176 | B1 | 8/2003 | Essiambre et al. ...... 359/161 |
| 6,771,853 | B2 * | 8/2004 | Watanabe .............. 385/24 |
| 6,792,214 | B1 | 9/2004 | Essiambre et al. ...... 398/147 |
| 2003/0058504 | A1 * | 3/2003 | Cho et al. ............. 359/161 |

OTHER PUBLICATIONS

Pieper W., et al., "Nonlinearity-insensitive standard-fibre transmission based on optical-phase conjugation in a semiconductor-laser amplifier," Electronics Letters, vol. 30, No. 9, pp. 724-726, Apr. 28, 1994.
Brener, I., et al., "Cancellation of all Kerr nonlinearities in long fiber spans using a $LiNbO_3$ phase conjugator and Raman amplification," OFC 2000, Paper PD 33-1, pp. 266-268.
Chowdhury, A., et al., "Compensation of Intra-channel Nonlinearities in 40Gb/s Pseudo-Linear Systems Using Optical Phase Conjugation," OFC 2004, Paper PDP32.
Forysiak, W., et al., "Reduction of Gordon-Haus Jitter in Soliton Transmission Systems by Optical Phase Conjugation," Journal of Lightwave Technology, vol. 13, No. 5, pp. 850-855, May 1995.
Chou, M.H., et al., "1.5-µm-Band Wavelength Conversion Based on Cascaded Second-Order Nonlinearity in $LiNbO_3$ Waveguides," IEEE Photonics Technology Letters, vol. 11, No. 6, pp. 653-655, Jun. 1999.
"Pseudo-Linear Transmission of High-Speed TDM Signals: 40 and 160 Gb/s" by Essiambre, R-J., et al.: Chapter 6 of *Optical Fiber Telecommunications IV-B: Systems and Impairments*, (2002 Elsevier Science, USA, Eds. Ivan Kaminow and Tingye Li), pp. 232-304 + 4 pages of plates.
Sugahara, H., et al., "6,050km transmission of 32×42.7 Gb/s DWDM signals using Raman-amplified quadruple-hybrid span configuration," OFC 2002 Postdeadline Papers (2002) pp. FC6-1 to FC6-2.

(Continued)

*Primary Examiner* — Agustin Bello
(74) *Attorney, Agent, or Firm* — Hitt Gaines, PC (57) ABSTRACT

An apparatus includes a non-solitonic all-optical communication path having serially connected first and second segments. The first segment end-couples to a lumped optical transmitter. The second segment end-couples to a lumped optical receiver. Each segment has a series of spans of transmission optical fibers. The all-optical communication path has an optical phase conjugator that optically end-couples the first segment to the second segment. The optical phase conjugator is positioned away from the path's midpoint.

22 Claims, 8 Drawing Sheets

OTHER PUBLICATIONS

Griffin, R.A., et al., "10 Gb/s Optical Differential Quadrature Phase Shift Key (DQPSK) transmission using GaAs/A1GaAs Integration," OFC 2002 Postdeadline Papers (2002) pp. FD6-1 to FD6-3.

Killey, R.I., et al., "Reduction of Intrachannel Nonlinear Distortion in 40-Gb/s-Based WDM Transmission over Standard Fiber," IEEE Photonics Technology Letters, vol. 12, No. 12, Dec. 2000, pp. 1624-1626.

Gnauck, A.H., et al., "2.5 Tb/s (64×42.7 Gb/s) Transmission Over 40×100 km NZDSF Using RZDPSK Format and All-Raman-Amplified Spans," OFC 2002 Postdeadline Papers (2002) pp. FC2-1 to FC2-3.

U.S. Appl. No. 10/152,645, filed May 21, 2002, Rene'-Jean Essiambre et al.

U.S. Appl. No. 10/442,287, filed May 20, 2003, Aref Chowdhury et al.

U.S. Appl. No. 10/441,532, filed May 20, 2003, Aref Chowdhury et al.

U.S. Appl. No. 10/835,753, filed Apr. 30, 2004, Aref Chowdhury et al.

U.S. Appl. No. 10/729,153, filed Dec. 5, 2003, Aref Chowdhury et al.

\* cited by examiner

ASYMMETRIC LONG-HAUL TRANSMISSION PATHS WITH OPTICAL PHASE CONJUGATION

BACKGROUND

1. Field of the Invention

The invention relates to fiber-optical communication systems and processes for operating such systems.

2. Discussion of the Related Art

In non-solitonic optical communication systems, a variety of techniques have been used to reduce the distortions of optical pulses that are caused by dispersion and nonlinear optical effects. The list of techniques includes pseudo-linear transmission, dispersion mapping, and optical phase conjugation. These techniques are able to significantly improve the transmission capabilities of long-haul optical communication systems.

Pseudo-linear transmission (PLT) involves transmitting optical pulses under operating conditions that include: a bit rate of 10 Giga bits per second (Gb/s) or more, a wavelength of 1.25 micrometers (µm) to 1.7 µm, a pulse full width at half maximum power of 60 pico seconds (ps) or less, and a pulse duty cycle of between 10% and 70%. PLT operating conditions are, e.g., described in U.S. Pat. No. 6,542,678. PLT operating conditions are advantageous when transmission single-mode optical fibers (SMFs) have high dispersions, e.g., about +2 ps or more per nanometer (nm) per kilometer (km) at 1550 nm. Due to their high dispersion, such transmission SMFs produce substantial broadening of optical pulses. The broadening causes inter-pulse interactions to be averaged thereby reducing the total pulse distortion from inter-channel interactions.

Dispersion mapping involves controlling the cumulative chromatic dispersion along an optical communication path via lumped in-line dispersion compensating devices. The in-line, dispersion-compensation devices cause the cumulative dispersion to make abrupt jumps at the ends of transmission SMFs. The resulting map of the cumulative dispersion may be singly periodic, multiply periodic, or aperiodic over the optical communication path. These kinds of nontrivial dispersion maps can reduce distortion of optical pulses due to both chromatic dispersion and intra-channel nonlinear optical effects.

Useful nontrivial dispersion maps have, e.g., been described in U.S. Pat. No. 6,583,907 and U.S. Pat. No. 6,606,176. In addition, advantageous pre-compensations for some dispersion maps are described in U.S. patent application Ser. No. 10/152,645, filed May 21, 2002 by R.-J. Essiambre et al.

An optical phase conjugator (OPC) reverses the phase of propagating optical signals. Optical communications systems have used OPCs to compensate for the pulse distortions caused by nonlinear optical effects. In particular, such systems have positioned a single OPC at the midpoint of symmetric optical communication paths. For such an arrangement, the second half of the optical communication path removes the distortions of an optical pulse that were produced in the first half of the optical communication path.

While the above-described techniques have helped to reduce pulse distortions in non-solitonic optical communication paths, further improvements are desirable.

BRIEF SUMMARY

The embodiments provide asymmetric long-haul all-optical communication paths having an in-line optical phase conjugator (OPC). In particular, the OPC is positioned away from the path's midpoint. Nevertheless, the OPC compensates for the distortions of optical signals, which are caused by nonlinear optical effects. In various embodiments, positioning the OPC away from the path's midpoint may provide important advantages.

In one aspect, the invention features an apparatus that includes a non-solitonic all-optical communication path having serially connected first and second segments. The first segment end-couples to a lumped optical transmitter. The second segment end-couples to a lumped optical receiver. Each segment has a series of spans of transmission optical fibers. The all-optical communication path has an optical phase conjugator that optically end-couples the first segment to the second segment. The optical phase conjugator is positioned away from the path's midpoint.

In another aspect, the invention features a method of optically communicating data. The method includes transmitting a stream of non-solitonic, optical data signals from a lumped optical transmitter over a first segment of a long-haul optical communication path. The first segment connects the lumped optical transmitter to an optical phase conjugator. The method includes optically phase conjugating the optical data signals in the optical phase conjugator and transmitting the optically phase conjugated data signals to a lumped optical receiver via a second segment of the long-haul optical communication path. The second segment connects the optical phase conjugator to the lumped optical receiver. The step of optically phase conjugating is performed at a substantial distance away from the path's midpoint.

BRIEF DESCRIPTION OF THE DRAWINGS

In the Figures and text, like reference numerals indicate elements with similar functions.

Various embodiments are described more fully by the figures and detailed description. The inventions may, however, be embodied in various forms and are not limited to the embodiments described in the figures and detailed description.

DETAILED DESCRIPTION

Herein, a long-haul optical communication path refers to a path that includes a series of transmission spans of SMF, wherein the total length of transmission SMFs along the path is 1,500 km or more and may be 2,500 km or more. Here, the total length disregards any in-line dispersion compensating fiber (DCF), which may be located between the transmission spans.

Figure 1:
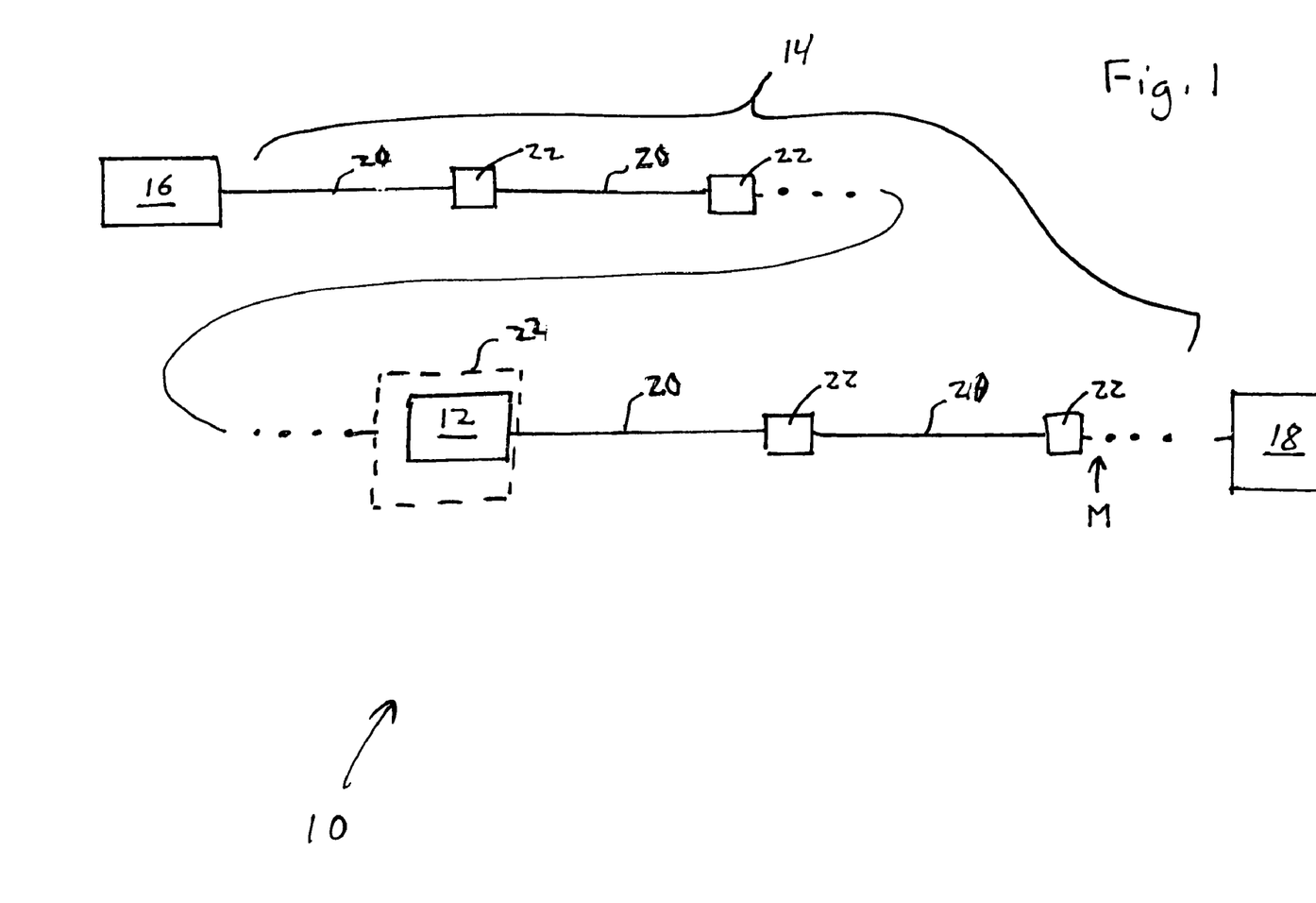
FIG. 1 shows an asymmetric long-haul optical communication system that includes a single optical phase conjugator (OPC)

FIG. 1 shows a long-haul optical communication system 10 that includes a single optical phase conjugator (OPC) 12. The optical communication system 10 includes a fiber-optical path 14 that provides an all-optical link between a lumped optical transmitter 16 and a lumped optical receiver of an optical receiver 18. The optical path 14 includes sequential first and second segments that are optically end coupled by the OPC 12. Each segment includes a series of transmission spans 20 that are end-coupled by in-line optical amplifiers 22. Each transmission span 20 is a single mode optical fiber (SMF) that may be a positive dispersion SMF, a negative dispersion SMF, or a hybrid optical SMF. The optical transmitter 16 modulates an optical carrier with a stream of digital data, e.g., digital voltage signals, and the optical receiver 18 demodulates the received optical carrier to produce a stream of received digital data, e.g., digital voltage signals.

Herein, lumped optical transmitters and receivers are devices that are localized in small areas. Lumped optical transmitters and receivers do not include the sections of transmission SMF that operate at transmission optical powers and connect the optical transmission line to the devices that actually perform conversions between electrical voltage signals and optical signals. Rather, those sections of transmission SMF are part of the optical transmission line itself.

The long-haul optical communication system 10 is configured to operate as a non-solitonic optical communication system. In particular, the system 10 is configured to not support optical soliton propagation therethrough. For example, the system 10 may maintain optical power levels that are below a threshold for soliton propagation in one or more of the transmission spans 20 of the fiber-optical path 14. For example, the system 10 may limit the propagation bandwidth sufficiently so that optical solitons cannot propagate through one or more transmission spans 20 of the fiber-optical path 14.

In solitonic long-haul optical transmission some compensation of dispersion is due to nonlinear optical transmission. Thus, to obtain a lowest bit error rate, solitonic long-haul optical transmission typically requires a substantial net residual dispersion (NRD) at the end of the optical transmission line, wherein the NRD is defined by the sum of the ordinary chromatic dispersions over the individual sections of the line. For example, the lowest bit error rate is obtained for an NRD whose magnitude is more than about 100 ps/nm, the long-haul optical transmission is solitonic. Solitonic long haul transmission may however, have optimal NRDs with smaller magnitudes.

Herein, embodiments of long-haul optical communication path 10 may operate in the PLT regime and/or provide dispersion mapping as, e.g., described in U.S. Pat. Nos. 6,542,678, 6,583,907, and 6,606,176; U.S. patent application Ser. No. 10/152,645, filed May 21, 2002 by R.-J. Essiambre et al; and U.S. patent application Ser. No. 10/442,287, filed May 20, 2003 by R.-J. Essiambre et al. The long-haul optical communication path 10 may use a low total excursion dispersion map as described in U.S. patent application Ser. No. 10/729,153, filed Dec. 5, 2003 by R.-J. Essiambre et al. Each of the above-listed U.S. patents and patent applications is incorporated herein by reference in its entirety.

Figure 2:
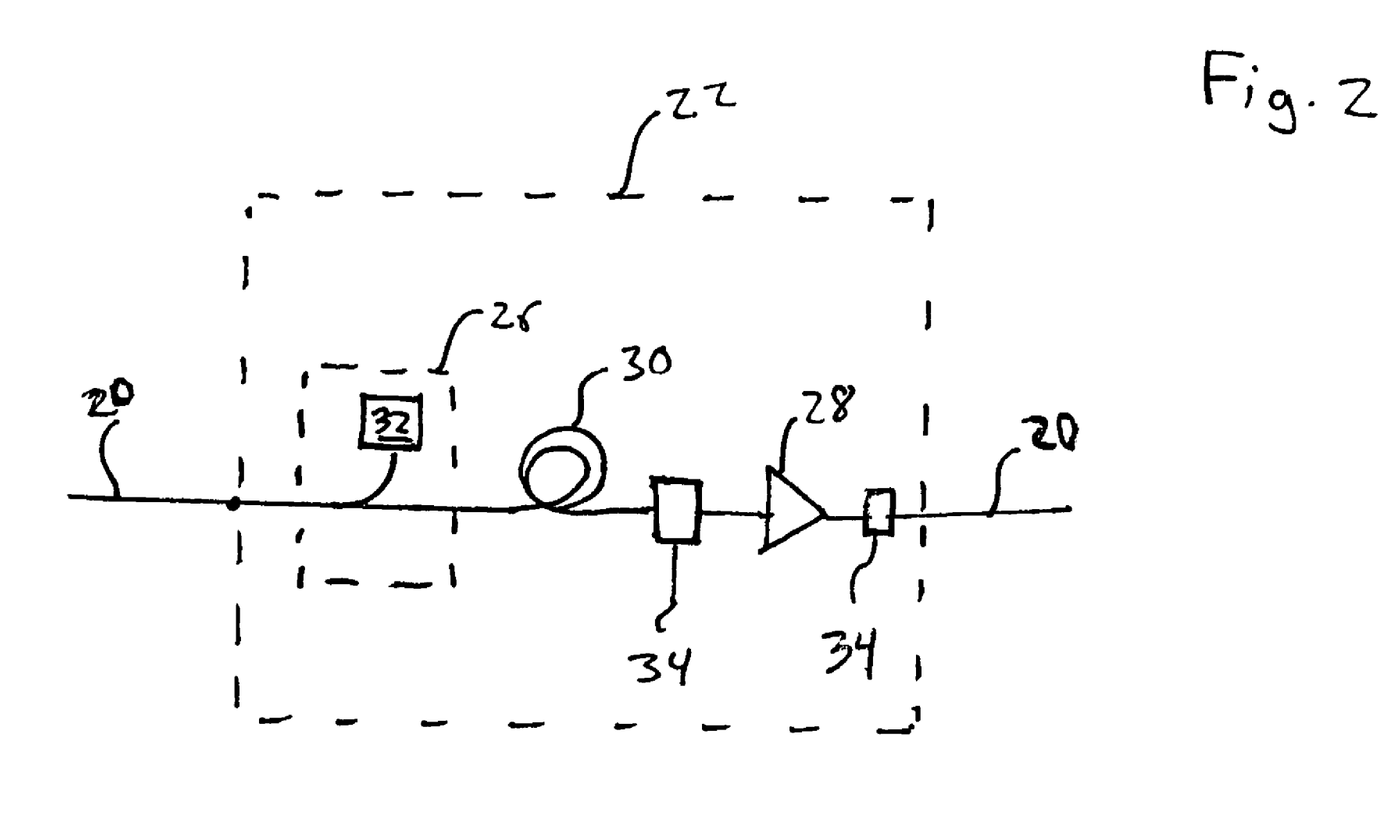
FIG. 2 shows an exemplary in-line optical amplifier of the optical communication system of FIG. 1.

FIG. 2 illustrates one embodiment of in-line optical amplifier 22. The in-line optical amplifier 22 includes forward and backward optical amplifiers 28, 26 and an in-line dispersion compensator 30. The forward optical amplifier 28 is a rare-earth doped amplifier, e.g., an erbium-doped fiber amplifier (EDFA), which amplifies the signal to be launched into the next transmission SMF 20. The backward optical amplifier 26 includes a laser 32 configured to backward pump the preceding transmission SMF 20 so that Raman amplification occurs in an end-section thereof. An exemplary dispersion compensator 30 includes dispersion compensating fiber (DCF) or another dispersion compensation device. The dispersion compensator 30 is located in a low power region between the backward and forward amplifiers 26, 28 to reduce nonlinear effects therein.

The in-line optical amplifiers 22 may also include one or more other in-line devices 34. Examples of these other in-line devices include optical filters, optical gain equalizers, and/or add/drop multiplexers 34.

Figure 3:
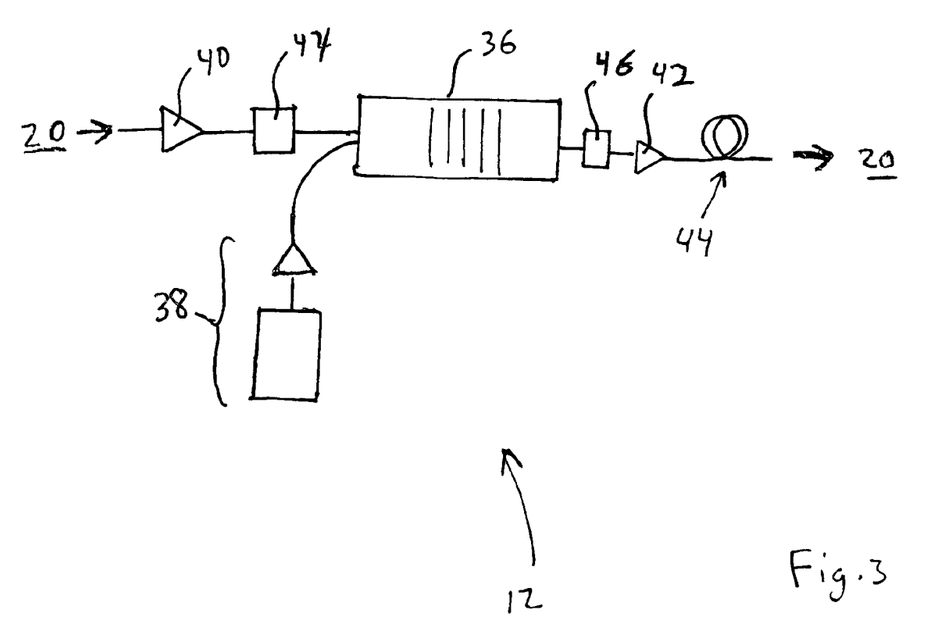
FIG. 3 shows an embodiment of the single in-line OPC of the optical communication system of FIG. 1.

FIG. 3 shows an exemplary OPC 12. The OPC 12 may be located in one of the in-line amplifiers 22 or may be an isolated in-line optical device connecting two transmission SMFs 20. The exemplary OPC 12 includes a periodically poled LiNbO$_3$ (PPLN) waveguide 36; a pump laser, e.g., a distributed feedback laser, with an associated EDFA 38; input and output optical amplifiers 40, 42; input and output optical filters 44, 46; and an optical dispersion compensator 48. The input optical amplifier 40 sets the input optical power to an appropriate level for the nonlinear optical PPLN waveguide 36. The output filter 46 removes pump and input light. Since optical phase conjugation also inverts cumulative dispersion, the dispersion compensator 48 is typically configured to restore the cumulative dispersion to its value prior to entering the OPC 12.

Referring to FIG. 1, optical phase conjugation often causes wavelength conversion. For that reason, the OPC 12 may be performed in a channel-by-channel manner in a wavelength division multiplexed (WDM) systems. Then, the OPC 12 would include an optical demultiplexer to separate incoming channels and an optical multiplexer to combine phase conjugated optical signals from the different channels. Then, each wavelength channel would also have a separate OPC, e.g., as shown in FIG. 3. Alternatively, in a WDM system, the OPC 12 may be formed by a sequence of an odd number of cascaded optical phase conjugators to provide a non-wavelength-converting form as described in U.S. patent application Ser. No. 10/441,532, filed May 20, 2004 by Aref Chowdhury et al, which is incorporated herein by reference in its entirety.

Finally, the OPC 12 may also be constructed to be polarization diverse as described in U.S. patent application Ser. No. 10/835,753, filed Apr. 30, 2004 by Aref Chowdhury et al, which is incorporated herein by reference in its entirety.

Referring again to FIG. 1, the optical communication system 10 positions the OPC 12 away from midpoint, M, of optical communication path 14. Herein, ½ of an optical communication path's transmission SMF is located before the path's midpoint, and ½ of the path's transmission SMF is located after the path's midpoint. In embodiments described by FIG. 1, the distance along the optical communication path 14 from the OPC 12 to the midpoint M is larger than the average length of a transmission SMF 20. For example, the OPC may be 100 km or more, 200 km or more, 400 km or more, or even 600 km or more from the midpoint M.

It may be convenient to position the OPC 12 at various asymmetric positions along the optical communication path 14. These positions may lie between about the ⅓ L point and the ⅔ L point on the optical communication path 14. Here, "L" is the combined length of transmission SMFs 20 for the optical communication path 14.

Conventionally, OPCs have been positioned at midpoints of symmetric optical communication paths. By time-reversal arguments, putting an OPC at the midpoint of a symmetric, optical communication path should compensate pulse distortions produced during transmission.

When an OPC is positioned away from the midpoint M of a long-haul optical communication path, the inventors have found that the OPC can still substantially compensate for undesirable nonlinear optical effects if the transmission system is operated via selected transmission modulation formats. For example, substantial compensation of pulse distortions, which are produced by nonlinear effects, should still occur when the transmitter 16 operates according to a carrier-suppressed return-to-zero (CSRZ)-on/off keyed (OOK) format. Thus, contrary to some conventional teachings, it may still be very advantageous from a performance point-of-view to place an OPC far from the midpoint of a long-haul optical communication path.

The inventions are however, intended to include more general embodiments. For example, embodiments where the transmitter transmits data according to formats other than CSRZ-OOK are within the scope of inventions herein. For example, the transmission format may be a return-to-zero format, a non-return-to-zero format, a phase-shift-keyed format, or a carrier-suppressed return-to-zero format and still be covered by inventions herein.

Figure 4A:
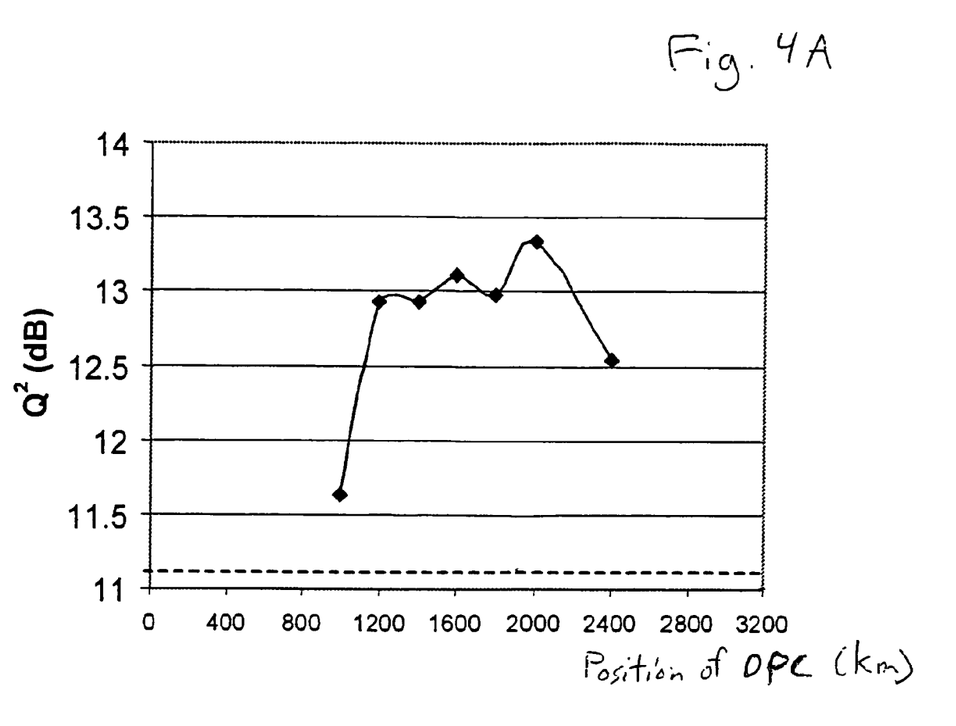
FIG. 4A plots the quality of the received pulses as a function of position of an in-line OPC for a setup that simulates a long-haul optical communication system whose optical communication path is 3,200 km long.
Figure 4B:
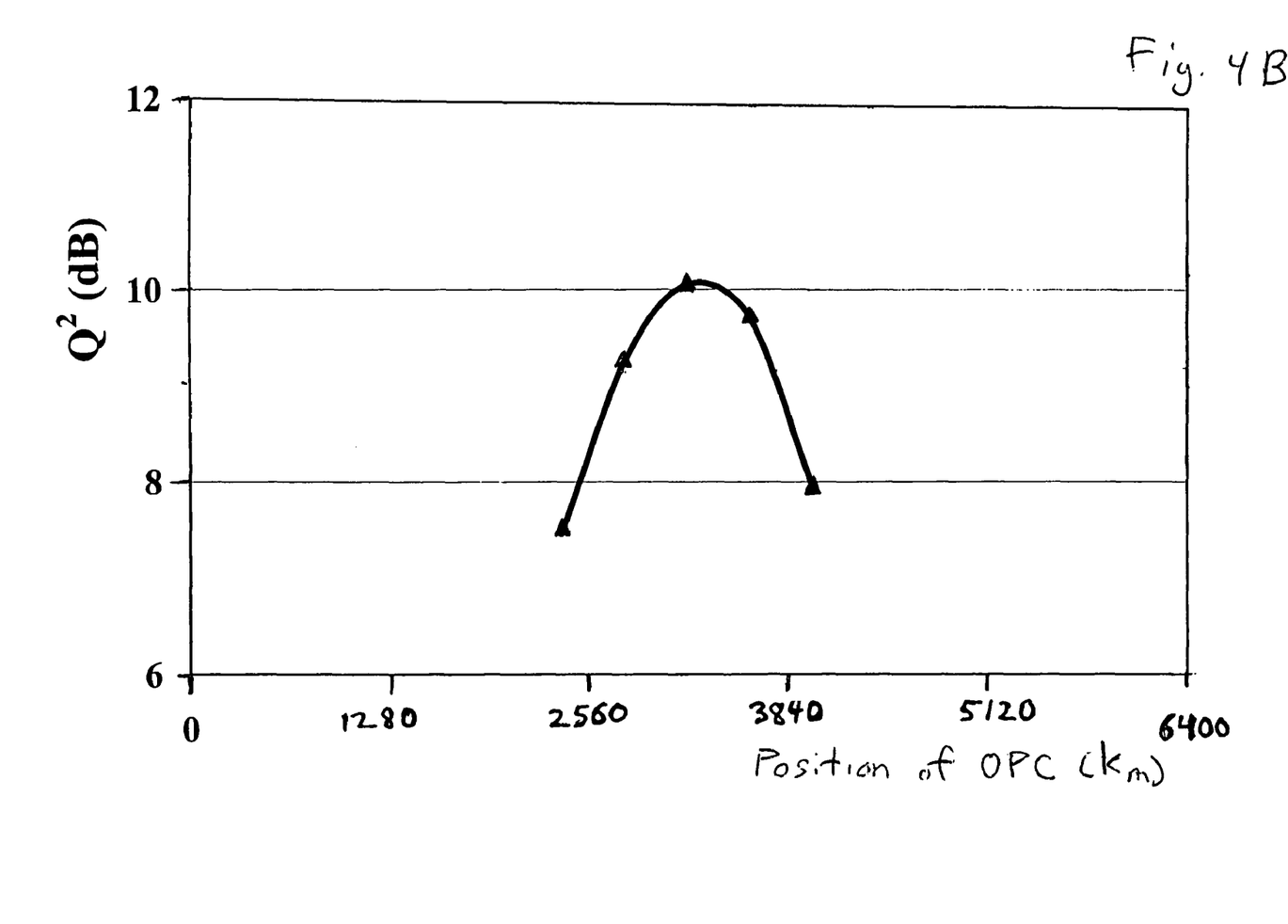
FIG. 4B plots the quality of the received pulses as a function of position of an in-line OPC for a setup that simulates a long-haul optical communication system whose optical communication path is 6,400 km long.

FIGS. 4A-4B provide data illustrating how the position of an OPC affects transmission quality in long-haul optical communication systems whose optical communication paths have lengths of about 3,200 km and about 6,400 km, respectively. The diamond-shaped and triangular data points are values of the eye-diagram quality, i.e., $Q^2$, for received optical pulses in systems with re-entrant, recirculating loops. The systems with re-entrant, recirculating loops experimentally simulate long-haul optical communication systems having the below-described properties as further illustrated by FIGS. 1-3.

In the experimentally simulated, long-haul optical communication systems, each transmission SMF 20 has a length of about 100 km, a positive dispersion about 4.5 ps/([nm][km]) at a wavelength of 1550 nm, a reduced dispersion slope, and a loss of about 21 dB. The SMFs are sold under the True-Wave® product name from OFS Corporation of Norcross, Ga. USA and Copenhagen, Denmark.

In the experimentally simulated, long-haul optical communication systems, the in-line optical amplifiers 22 include both backward Raman and forward EDFA amplifiers 26, 28, dispersion compensators 30, and other devices 34 as shown in FIG. 2. The Raman and EDFA amplifiers 26, 28 produce an asymmetric power scheme in transmission SMFs 20. In the asymmetric power scheme, the difference between the forward and backward optical powers at the two ends of the same transmission SMF 20 is about +6 dB. The in-line dispersion compensators 30 used DCFs that provided nominal dispersions of about −430 ps/nm at 1550 nm. Also, every other or every fourth in-line optical amplifier 20 included a dynamic gain-equalizing optical filter 34 that adjusted the frequency-flatness of the system.

In the experimentally simulated, long-haul optical communication systems, the transmission spans provided singly periodic dispersion maps. The dispersion maps provided a net residual dispersion per span of about +20 ps/nm, a pre-compensation that varied with the system, and a post-compensation that approximately optimized transmission, i.e., close to 0 ps/nm of net residual dispersion. In the 3,200 km long path of FIG. 4A, the selected pre-compensation values was about −350 ps/nm with the OPC and was about −330 ps/nm without the OPC. The re-entrant recirculating loop for simulating this path included about 200 km of transmission SSMF, i.e., two spans of TrueWave® non-zero dispersion fiber with reduced dispersion slope. The SSMF is available from the OFS Corporation. In the 6,400 km long path of FIG. 4B, the selected pre-compensation values was about −730 ps/nm with the OPC. The re-entrant recirculating loop for simulating this path included about 400 km of transmission SSMF, i.e., multiple spans of the above-described SSMF.

In the experimentally simulated, long-haul optical communication systems, the optical transmitters 16 transmitted optical pulses according to a carrier suppressed return-to-zero (CSRZ) and on/off keyed (OOK) format over a channel whose center wavelength was about 1550.5 nm. The optical transmitter 16 also transmitted data at a rate of about 40 Gb/s in the PLT regime.

In the simulated long-haul optical communication systems, the OPC 12 had a form similar to PPLN-based OPC of FIG. 3. The OPC 12 operated in a cascaded $\chi^{(2)}$ configuration, wherein the PPLN waveguide 36 generated 1555.6 nm converted light in response to the input light and pump light at about 1553 nm. The pump power and input powers were 100 milli-watts (mW) and 25 mW so that the PPLN waveguide 36 had an efficiency of about −14 dB. During operation, the PPLN waveguide 36 was maintained at 112° C. to reduce the photorefractive effect. The OPC 12 also included input and output arrayed waveguide gratings to simulate optical demultiplexers and multiplexers of a WDM system.

FIG. 4A shows how transmission quality, $Q^2$, varied with placement of the OPC in simulated 3,200-km optical communication paths. The diamond-shaped data points plot measured $Q^2$ values for OPC positions between about 1,000 km and about 2,400 km, wherein the OPC position was shifted by about 200 km between adjacent data points. The solid line is an aid for visualizing the data points. The dotted line plots $Q^2$ values for a long-haul optical communication path without an OPC.

In FIG. 4A, the diamond-shaped data points show that a wide range of OPC positions improve transmission performance, i.e., quality of received pulses. In particular, OPC positions between about 1,000 km and about 2,400 km lead to an increase of more than a 1 dB in the $Q^2$ value as compared to an optical communication path without an OPC. Thus, placing the OPC anywhere from about 600 km to the left of the path's midpoint to about 800 km to the right of the path's midpoint seems to significantly improve transmission performance. Placing the OPC between about ⅓ and ⅔ of the transmission SMF-length of the optical communication path provides very substantially improved $Q^2$ values as compared to an optical communication path without an OPC.

FIG. 4B shows how transmission quality, $Q^2$, varied with placement of the OPC in simulated 6,400-km optical communication paths. The triangular data points plot measured $Q^2$ values for OPC positions between about 2,400 km and about 4,000 km, wherein the OPC position was shifted by about 400 km between adjacent data points. The solid line is an aid for visualizing the data points. Without an OPC, transmission performance was substantially worse than any of graphed data values.

FIG. 4B shows that a relatively wide range of OPC positions still improves transmission performance, i.e., as fixed by the quality of eye diagrams or received bit error rates. In particular, placing the OPC anywhere between about 600 km before the path's midpoint to about 600 km after the path's midpoint leads to significantly improved performance. That is, at positions between about ⅜ and ⅝ of the path length, the OPC provides a substantial improvement over $Q^2$ values without an OPC.

In comparison, a 6,400 km long, optical communication path without an OPC would typically cause a bit error rate that is simply unacceptably high. In optical communication paths, the value of $Q^2$ is greater than about 9.0 to 9.3 so that the raw bit error rate is $2\times10^{-3}$ or less. For such low raw error rates, forward error correction codes are typically able to reduce received bit error rates to acceptably low values of around $10^{-15}$. To obtain such values of $Q^2$, the OPC position is preferably not more than about 400 km from the midpoint of the 6,400 km system.

All-optical communication paths with an OPC and with lengths of 3,200 to 6,400 km seem to perform substantially better with an asymmetrically positioned in-line OPC than without an OPC in specific situations. Exemplary situations include configuring the systems to operate at low power, i.e., in non-solitonic regimes; transmitting optical signals according to CSRZ and OOK formats; and placing the OPC at a distance from the path's midpoint in one of the ranges [100 km, 600 km], [200 km, 600 km], and [100 km, 400 km].

Figure 5:
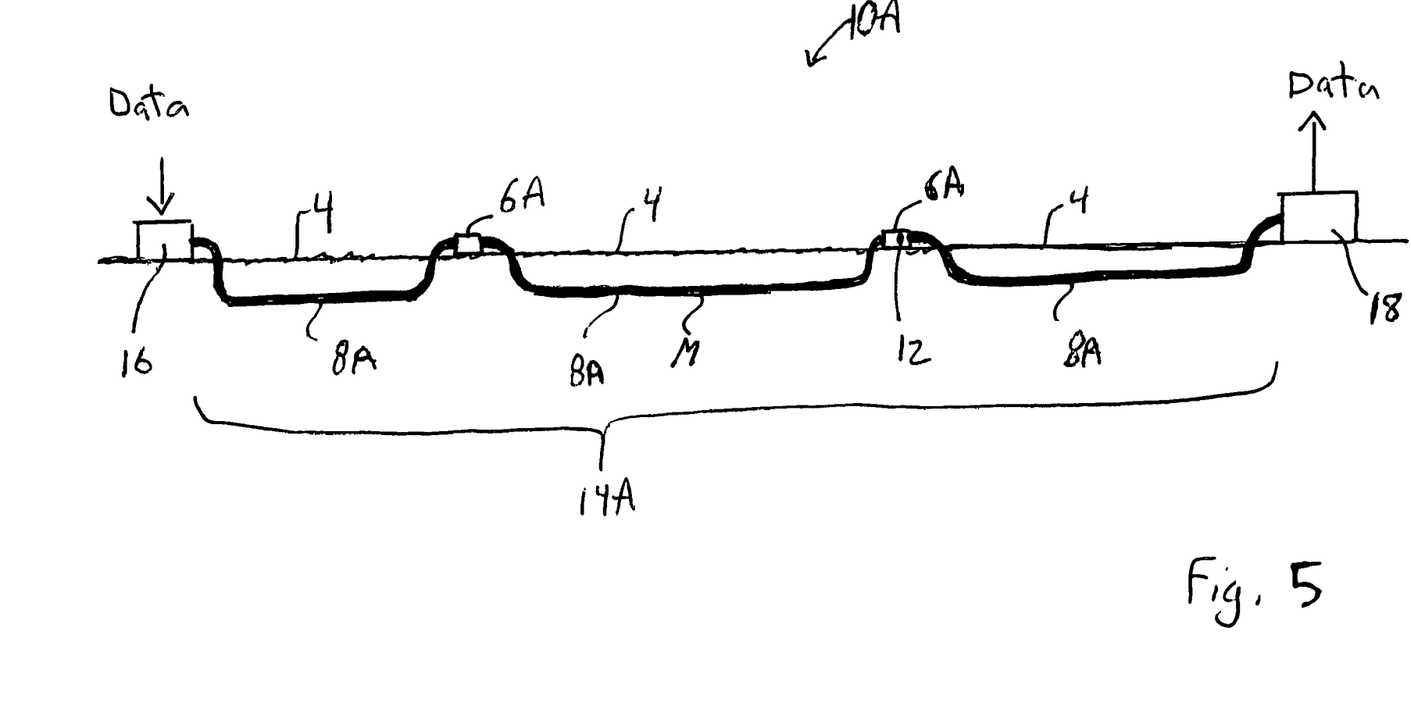
FIG. 5 shows an embodiment of a long-haul optical communication system in which a substantial portion of the optical communication path is buried or otherwise inconvenient to access.
Figure 6:
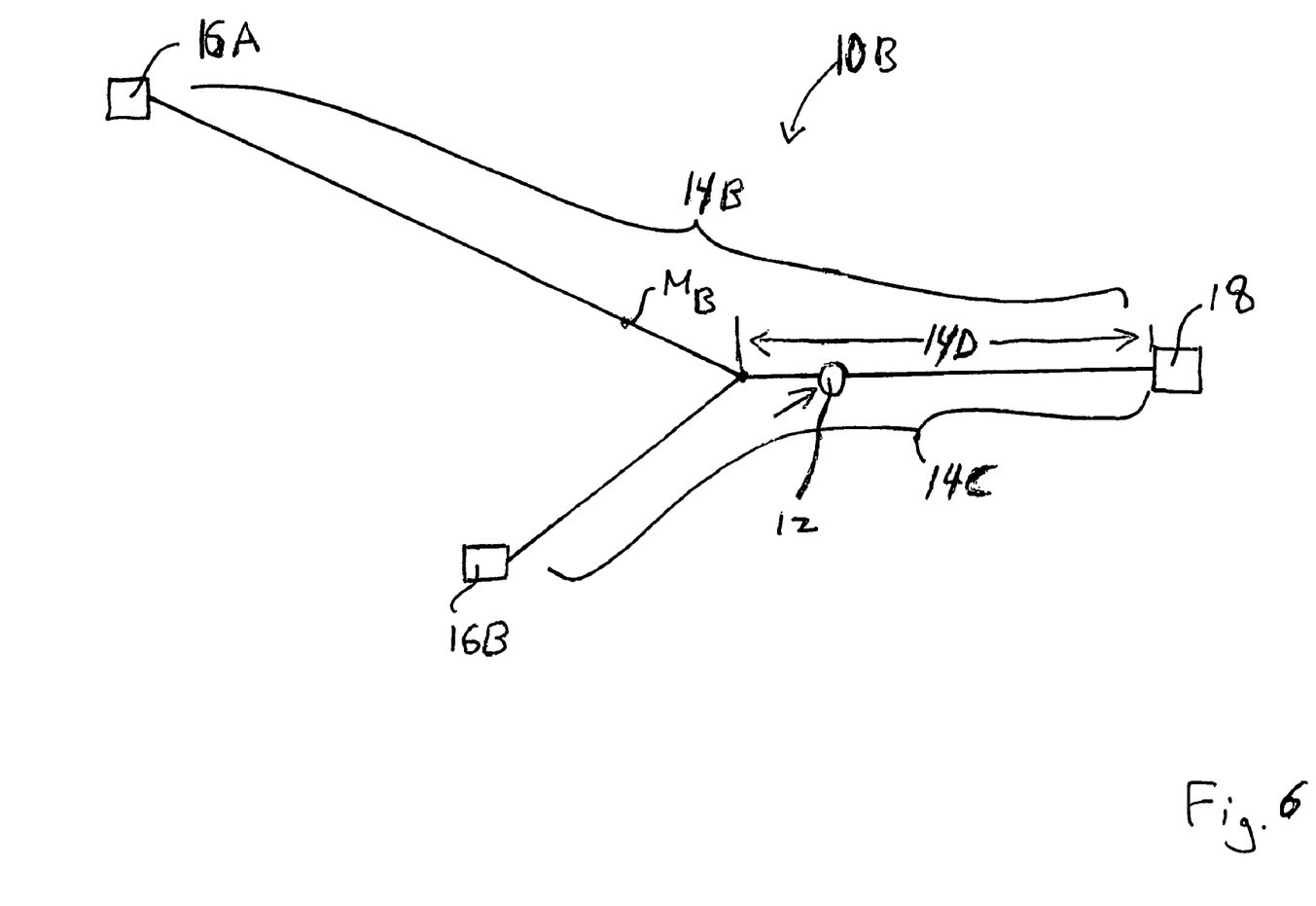
FIG. 6 shows an embodiment of a long-haul optical communication system having a branched, optical communication path.

In a long-haul optical communication path, the ability to asymmetrically position an OPC and still significantly compensate for undesired nonlinear optical effects has a variety of applications. For example, such a freedom to position the OPC is, e.g., useful where it would be inconvenient to position the OPC at the optical path's midpoint. FIGS. 5 and 6 show two embodiments of optical communication systems 10A, 10B where it is inconvenient to position an OPC at the midpoints of the optical communication paths.

Referring to FIG. 5, optical communication system 10A includes a non-solitonic all-optical long-haul fiber-optical communication path 14A that links lumped optical transmitter 16 to lumped optical receiver 18. The fiber-optical communication path 14A includes both inaccessible segments 8A and surface access points 6A. Notably, the inaccessible segments 8A include sequences of transmission SMFs that are buried beneath ground and/or water 4. The access points 6A include in-line devices that provide for treatment of optical pulses, e.g., optical amplification, equalization, chromatic dispersion compensation, and/or add/drop multiplexing.

While the surface access points 6A are distant from the lumped optical transmitter 16 and receiver 18, none of the surface access points 6A is located at the midpoint M of the optical communication path 10A. One of the access points 6A includes an OPC 12. Nevertheless, since none of the surface access points 6A is near the optical path's midpoint, the OPC 12 is also not located near the optical path's midpoint M. It would have been inconvenient to position the OPC 12 near the optical path's midpoint M, because the midpoint M is at a buried segment 8A of the optical communication path 14A. Though the OPC 12 is not near the optical path's midpoint M, it still provides substantial compensation for undesired nonlinear optical effects for reasons that have already been described.

The optical communication system 10A provides an attractive possibility for improving deployed optical communication paths. Indeed, many deployed optical communication paths have path midpoints at inaccessible or inconveniently accessible segments of the optical paths. Thus, positioning an added OPC at an asymmetric position may be attractive from the point of view of cost of implementing the improvement. For example, such cost-effective improvements may produce adequate performance improvements if combined with appropriate and simple changes of the transmission modulation format, e.g., to the CSRZ-OOK modulation format.

FIG. 6 shows a non-solitonic fiber-optical communication system 10B with a branched structure and an OPC 12. The system 10B has a first long-haul optical communication path 14B that provides an all-optical data link between lumped optical transmitter 16A and lumped optical receiver 18 and also has a second long-haul optical communication path 14C that provides an all-optical data link between lumped optical transmitter 16B and the same lumped optical receiver 18. The two optical communication paths 14B and 14C share an optical path segment 14D. The shared path segment 14D includes one or more transmission spans of SMF.

The two fiber-optical communication paths 14B, 14C have substantially different path lengths. For that reason, their respective path midpoints $M_B$ and $M_C$ do not substantially coincide, e.g., the midpoints may be farther apart than the average length of a transmission span or even farther than 100 km or 200 km apart. Thus, an OPC cannot be positioned at the midpoints $M_B$, $M_C$ of both optical communication paths 14B, 14C. For that reason, the OPC 12 has been positioned away from the midpoint $M_B$ of the optical communication path 14B.

In the illustrated embodiment, the optical path segment 14D is shared by both optical communication paths 14B, 14C and one of the midpoints $M_C$ is located on the shared optical path segment 14D. In this embodiment, the OPC 12 can also be located at the midpoint $M_C$. More generally, the placement of the OPC 12 should be selected to satisfy the above-described conditions for asymmetrically placed OPCs (see e.g., discussion of FIG. 1). Then, the OPC 12 significantly reduces distortions of optical pulses by nonlinear optical effects produce in either optical communication path 14B, 14C.

Figure 7:
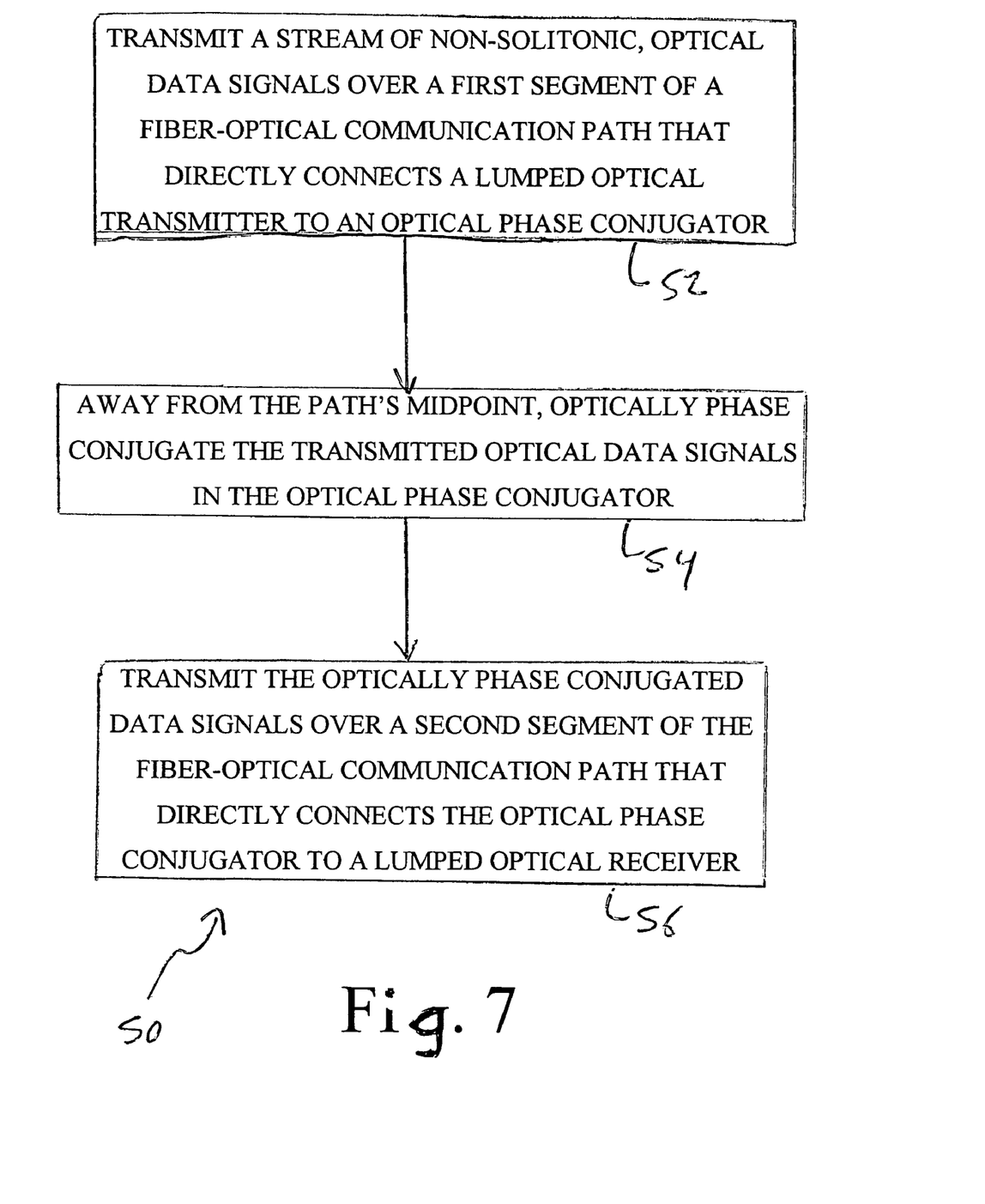
FIG. 7 is a flow chart illustrating a method of operating an asymmetric long-haul optical communication system having an in-line OPC.

FIG. 7 shows a method 50 for communicating data via an asymmetric long-haul fiber-optical communication system with an in-line OPC, e.g., the long-haul optical communication system 10, 10A, or 10B of FIG. 1, 5, or 6.

The method 50 includes transmitting a stream of non-solitonic optical data signals from a lumped optical transmitter, e.g., lumped optical transmitter 16 of FIG. 1, over a first segment of a long-haul fiber-optical communication path (step 52). Exemplary embodiments transmit the stream of optical data signals in a CSRZ-OOK format. The first segment connects the lumped optical transmitter to an optical phase conjugator, e.g., OPC 12 of FIG. 1. The method 50 includes optically phase conjugating the transmitted optical data signals in the optical phase conjugator (step 54). The method 54 also includes transmitting the optically phase conjugated data signals to a lumped optical receiver, e.g., lumped optical receiver 18 of FIG. 1, via a second segment of the long-haul optical communication path (step 56). The second segment optically connects the optical phase conjugator to the lumped optical receiver.

In the method 50, the step of optically phase conjugating the optical signals is performed at a substantial distance away from the path's midpoint, e.g., midpoint M of FIG. 1. For example, the optical phase conjugating may be performed at a distance of 100 or more kilometers from the path's midpoint or even at a distance of 200 or more kilometers from said midpoint.

In the method 50, one or both steps of transmitting includes maintaining one or more transmission spans of the optical communication path under special conditions that do not support the propagation of optical solitons. These special conditions may include maintaining transmitted and/or amplified optical power intensities below a threshold for optical soliton production or propagation in one or more transmission fiber spans. These special conditions may also include limiting transmission bandwidths in a manner that impedes or stops optical solitons from propagating in one or more transmission spans of the optical communication path.

In some embodiments, the method 50 includes transmitting another stream of non-solitonic optical data signals from a lumped optical transmitter via a first segment of another long-haul optical communication path. The first segment may, e.g., be the portion of optical path 14C of FIG. 6 located to the left of OPC 12. In these embodiments, the method 50 includes optically phase conjugating the optical data signals of the other stream. In these embodiments, the method 50 includes then, transmitting the optically phase conjugated data signals of the other stream to a lumped optical receiver via a second segment of the other optical communication path. The second segment may, e.g., be the portion of optical path 14C of FIG. 6 located to the right of OPC 12. In these embodiments, the first and second optical paths have one or more shared transmission spans and may have different path lengths. Also, the two optical communication paths form a branched structure such that they transmit optical data signals either from different lumped optical transmitters or to different lumped optical receivers.

From the disclosure, drawings, and claims, other embodiments of the invention will be apparent to those skilled in the art.

What we claim is:

1. An apparatus, comprising:
    a non-solitonic all-optical communication path forming an optical path from a lumped optical transmitter to a lumped optical receiver and having an optical phase conjugator, the non-solitonic all-optical communication path being formed of first and second segments and the optical conjugator, the first segment end-coupling to the lumped optical transmitter, the second segment end-coupling to the lumped optical receiver, each segment having a series of spans of transmission optical fiber and being without an optical phase conjugator therein; and
    wherein the optical phase conjugator optically end-couples the first segment to the second segment and is positioned away from the path's midpoint; and
    wherein the combined length of the transmission optical fibers of the first segment differs from the combined length of the transmission optical fibers of the second segment by at least an average length of a span over the path.

2. The apparatus of claim 1, wherein the combined length of the transmission optical fibers of the first segment differs from the combined length of the transmission optical fibers of the second segment by at least 100 kilometers.

3. The apparatus of claim 1, wherein the combined length of the transmission optical fibers of the first segment differs from the combined length of the transmission optical fibers of the second segment by at least 200 kilometers.

4. The apparatus of claim 2, wherein the phase conjugator is located within at least 600 kilometers of the midpoint of the path.

5. The apparatus of claim 1, wherein at least a portion of the optical communication path is configured to produce optical power intensities that are below a threshold for optical soliton propagation.

6. The apparatus of claim 1, wherein the optical transmitter is configured to transmit the data to the path via a format selected from the group consisting of a return-to-zero format, a non-return-to-zero format, a phase-shift-keyed format, and a carrier-suppressed return-to-zero format.

7. The apparatus of claim 1, wherein the lumped optical transmitter is configured to transmit digital data to the path via a carrier-suppressed return-to-zero modulation format.

8. The apparatus of claim 7, wherein the optical transmitter is configured to transmit the data to the path via a carrier-suppressed return-to-zero on/off keyed modulation format.

9. The apparatus of claim 1, wherein a substantial portion of the path around the path's midpoint is buried under the earth or under water.

10. The apparatus of claim 1, further comprising:
    a second non-solitonic optical communication path forming an optical path from another lumped optical transmitter to the lumped optical receiver, the second path being formed of first and second segments and an optical phase conjugator that serially couples the first and second segments of the second path together; and
    wherein the two optical communication paths share one or more spans of transmission optical fiber.

11. The apparatus of claim 10, wherein the midpoints of the two optical communication paths are not substantially coincident.

12. A method of optically communicating data, comprising:
    transmitting a stream of non-solitonic, optical data signals from a lumped optical transmitter over a first segment of a long-haul all-optical communication path, the first segment connecting the lumped optical transmitter to an optical phase conjugator;
    optically phase conjugating the optical data signals in the optical phase conjugator; and
    transmitting the optically phase conjugated data signals to a lumped optical receiver via a second segment of the long-haul all-optical communication path, the second segment connecting the optical phase conjugator to the lumped optical receiver, each of the segments having a series of spans of transmission optical fiber and being without an optical phase conjugator therein;
    wherein the first and second segments and the optical phase conjugator form an optical path from the lumped optical transmitter to the lumped optical receiver; and
    wherein the optically phase conjugating is performed at a substantial distance away from the path's midpoint, the combined length of the transmission optical fibers of the first segment differing from the combined length of the transmission optical fibers of the second segment by at least an average length of a span over the path.

13. The method of claim 12, wherein the stream of optical data signals is modulated in a format selected from the group consisting of a return-to-zero format, a non-return-to-zero format, a phase-shift-keyed format, and a carrier-suppressed return-to-zero format.

14. The method of claim 12, wherein the stream of optical data signals is in a carrier-suppressed return-to-zero format.

15. The method of claim 12, wherein the optically phase conjugating is performed at least 100 kilometers from the path's midpoint.

16. The method of claim 12, wherein the optically phase conjugating is performed at least 200 kilometers from the path's midpoint.

17. The method of claim 12, wherein one of the transmitting steps includes maintaining an optical power intensity below a threshold for optical soliton propagation in a portion of one of the first segment and the second segment.

18. The method of claim 12, further comprising:
    transmitting another stream of non-solitonic, optical data signals from another lumped optical transmitter via a first segment of another long-haul all-optical communication path;
    optically phase conjugating the optical data signals of the another stream; and transmitting the optically phase conjugated data signals of the another stream to the lumped optical receiver via a second segment of the another path, the another path being formed of the first and second segments thereof and an optical phase conjugator and forming an optical path from the another lumped optical transmitter to the lumped receiver; and wherein the first and second optical paths have one or more shared transmission spans and have different path lengths.

19. The method of claim 12, further comprising:

transmitting another stream of non-solitonic optical data signals from the lumped optical transmitter via a first segment of another long-haul all-optical communication path;

optically phase conjugating the optical data signals of the another stream; and transmitting the optically phase conjugated data signals of the another stream to another optical lumped optical receiver via a second segment of the another path, the another path being formed of the first and second segments thereof and an optical phase conjugator and forming an optical path from the another lumped optical transmitter to the lumped receiver; and wherein the first and second optical paths have one or more shared transmission spans and have different path lengths.

20. The apparatus of claim 1, wherein the optical phase conjugator is formed by a sequence of an odd number of cascaded optical phase conjugators to provide a non-wavelength-converting form.

21. The apparatus of claim 20, further comprising:

a second non-solitonic all-optical communication path from another lumped optical transmitter to the lumped optical receiver, the second path being formed of first and second segments of the second path and an optical phase conjugator that serially couples the first and second segments of the second path together; and wherein the two optical communication paths share one or more spans of transmission optical fiber and the midpoints of the two optical communication paths are not substantially coincident.

22. The method of claim 12, wherein the optically phase conjugating is performed by a sequence of an odd number of cascaded optical phase conjugators to provide a non-wavelength-converting form.

* * * * *